Zelma P. Cordwell
INVENTOR.

Oct. 19, 1943.　　　Z. P. CORDWELL　　　2,332,439
CUTTING DEVICE
Filed July 7, 1943　　　2 Sheets-Sheet 2

Zelma P. Cordwell  INVENTOR.

BY
Attorney

Patented Oct. 19, 1943

2,332,439

UNITED STATES PATENT OFFICE 2,332,439

CUTTING DEVICE

Zelma P. Cordwell, Glen Ridge, N. J.

Application July 7, 1943, Serial No. 493,788

5 Claims. (Cl. 30—131)

This invention relates to a cutting device and more particularly to a device for cutting bread for tea sandwiches, pastry, meat, cheese and the like into attractive decorative designs.

Heretofore in the preparation of sandwiches, pastry and other food materials in decorative shapes, it has been necessary to resort to a tiresome and time-consuming procedure of cutting out the desired designs with a shaped metal receptacle-like cutter, which is manually pressed down on the material to be cut, accompanied by a twisting motion in order to loosen the cut-out portion from the remaining material. This conventional method many times fails to provide a sharp edge to the cut-out material, presenting a ragged or torn appearance and sometimes distorting the design, thus detracting from the attractive appearance intended by the design shape.

In the improved device of the present invention, these and other defects of previously available cutters for the purpose indicated are eliminated and important advantages provided, whereby the preparation of certain foods in attractive designs is greatly facilitated.

This invention has as an object the provision of an improved device for cutting bread for tea sandwiches, pastry, meat, cheese, biscuits, cookies and the like with greater ease and speed. Another object is the provision of a cutting device which does not distort the intended design of the cut-out material. Another object is the provision of a cutting device which provides a sharp, even edge in the cut-out material. Another object of the invention is the provision of a cutting device which greatly reduces the amount of applied effort or force needed to cut out the desired material. A further object is the provision of a cutting device which is simple and sturdy in construction and durable in its intended usage. A still further object of the invention is the provision of a cutting device which permits ready interchange of any desired design shape. Other objects will appear as the description of the invention proceeds.

These objects are accomplished in accordance with the present invention by means of a scissors-like, cutting device comprising a pair of pivoted handles, each handle carrying an oppositely disposed, receptacle-like cutter adapted to telescope snugly one within the other. In the preferred embodiment, each handle terminates in a U-shaped forked arm which is adapted to fit into corresponding grooves, slots, channels or tubes on the back of the receptacle-like cutters, thus facilitating ready removal and replacement of the cutters and permitting interchange of different cutter design shapes.

The invention consists in certain peculiarities of construction and unique combination of parts, as will be hereinafter described with reference to the accompanying drawings which represents preferred embodiments of the invention.

Figure 5:
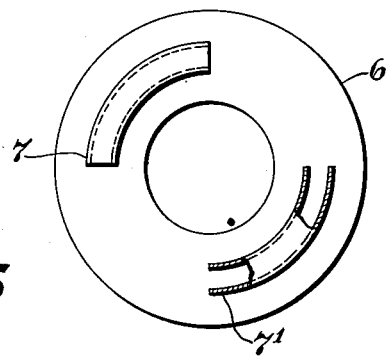
Figures 5 and 6 represent an alternative means for providing detachable cutters wherein two oppositely disposed quadrant slots, grooves or tubes are constructed on the outside of each cutter to receive corresponding quadrant arms at the handle terminus which permit the engaging or disengaging of the cutters by a quarter turn of the cutters.
Figure 6:
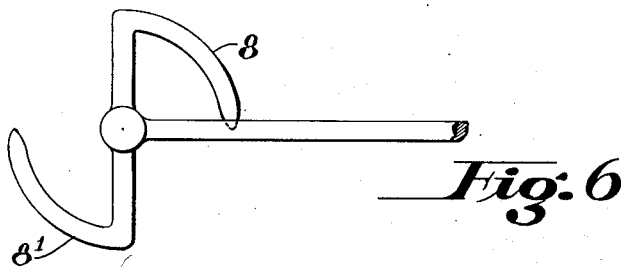
Figure 7:
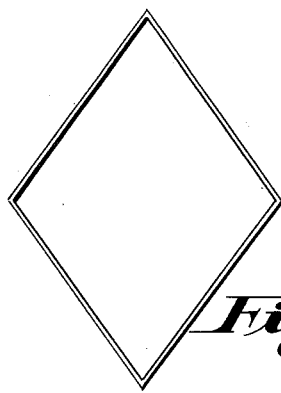
Figures 7 and 8 illustrate other design shapes which in practice would be fitted with the slots, grooves or tubes shown in Figure 3 or Figure 5.
Figure 8:
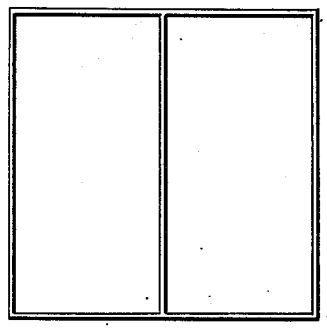

Referring specifically to the drawings: the numerals 1 and 1' indicate forked arms connected by a pivot 2, the forked arms beyond the pivot having extended therefrom handles 3 and 3' terminating in the finger loops 4 and 4'. The forked arms are inserted in properly placed tubes 5 and 5' affixed to the back of the cutters 6 and 6' which have cutting edges, particularly the cutter which moves inside the other when the device is closed. In Figures 5 and 6 which show an alternative means for attaching and detaching the cutters, 7 and 7' indicate quadrant slots, grooves or tubes in or on the surface of the cutters which are constructed to receive corresponding quadrant arms 8 and 8' and to thus permit the engagement or disengagement by a quarter turn of the cutters.

Figure 1:
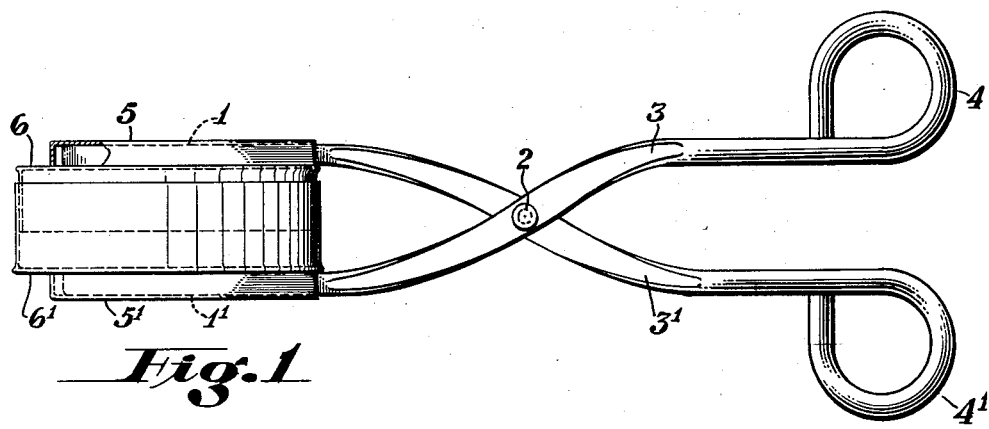
Figure 1 represents a side elevational view of the cutting device in a closed position.
Figure 2:
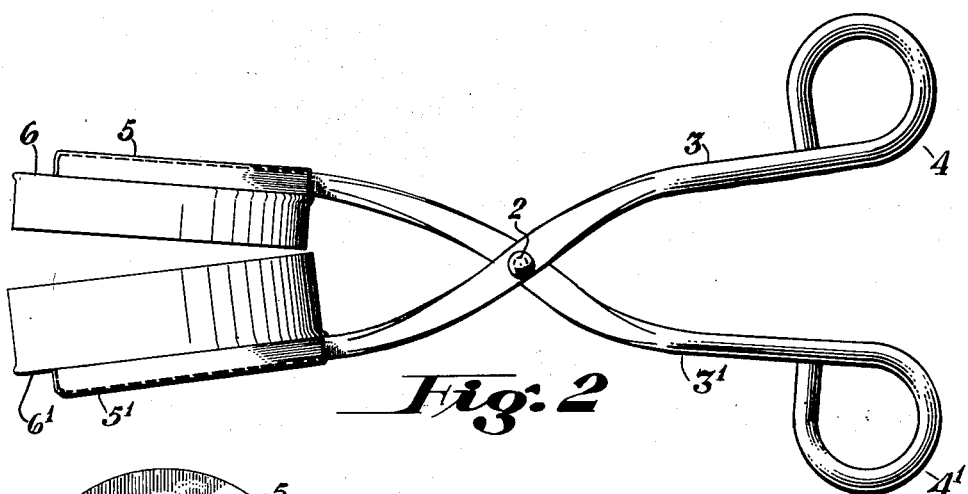
Figure 2 is a similar view with the device in an open position.
Figure 4:
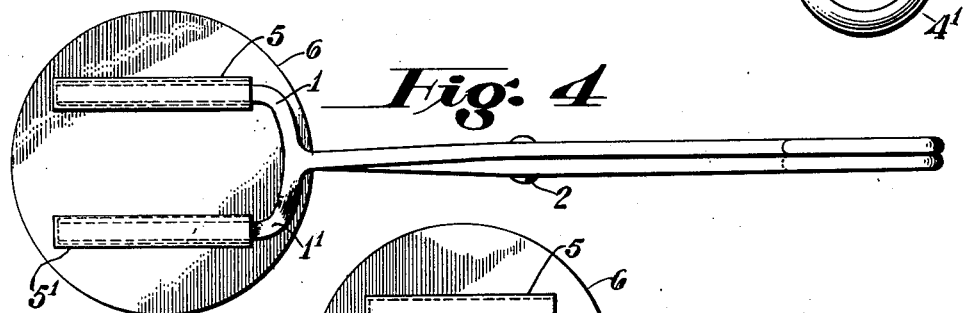
Figure 4 is a top view of the cutting portion of the device showing the U-shaped forked arm in place within the holding tubes.
Figure 3:
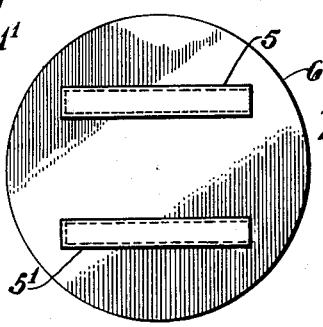
Figure 3 is a top view of one of the removable cutters showing a convenient and a preferred arrangement of the tubes adapted to receive the forked U-shaped arm which forms one terminus of the handles.

In operating the device, the sandwich bread, pastry, cheese or the like is held between the cutters while in the open position as shown in Figure 2 and manual pressure exerted at the finger loops 4 and 4' to close the cutters. The cutters are then opened and the cut-out material readily removed.

The device is illustrated in the drawings by way of a circular, diamond or square shape for the cutters but any desired decorative shape such as oval, triangular, rectangular, heart-shape, and other symmetrical or asymmetrical designs may be employed.

As previously stated, the cutter designs are detachable and interchangeable by sliding them free from the retaining forked arms or by means of a quarter turn when the retaining means consists of quadrant slots, grooves or tubes as shown in the drawings. The use of tubes as cooperative retaining means for the forked arms as illustrated in the drawings comprises a suitable construction, but other means such as slots or grooves or punched-out portions in the back of the cutting designs so as to receive the forked arms are likewise suitable.

The use of the forked or quadrant arms to retain the cutting designs in addition to permitting ready interchange of various design cutters afford a particularly sturdy and balanced construction that provides a sharp, even edge to the cut-out material and facilitates the operation for which the device is intended. If the interchanging of various design cutters is not required, the invention contemplates a modification whereby the cutters may be permanently joined with the arms comprising the terminus of the handles. In this modification the arm may be forked as in the preferred embodiment or looped or otherwise arranged to give adequate strength and permanently soldered or welded to the back of the cutter designs.

If desired, the back of one or both cutters may be perforated, for example, between the tubes or other retaining means, in order to facilitate removal of the cut-out material from the cutter.

The device is useful in cutting many types of food materials into attractive ornamental designs including such materials as tea sandwiches, pastry, cheese, vegetables and meat.

The improved device is characterized by a number of advantages including particularly the elimination of the tiresome and time-consuming effort required by earlier devices. In the preferred embodiments, the design shapes are readily interchangeable, thus extending the usefulness of the device. A sturdy, well-balanced construction is afforded which provides longer life for the device and, in addition, assures a sharp, even edge in the cut-out material. When the device is employed for cutting filling material for sandwiches such as cheese, meat and vegetables, a perfectly fitting filler is provided which adds to the appearance of the combination.

It is apparent that many widely different embodiments of the invention may be made without departing from the spirit and scope thereof; and, therefore, it is not intended to be limited except as indicated in the appended claims.

I claim:

1. A cutting device, particularly adapted for cutting sandwiches, pastry, meat, cheese and the like in any desired shape comprising two pivoted handles terminating in a pair of oppositely disposed similarly shaped, receptacle-like cutters adapted to telescope snugly one within the other.

2. A cutting device, particularly adapted for cutting sandwiches, pastry, meat, cheese and the like comprising two pivoted handles terminating in U-shaped forked arms, oppositely disposed, detachable, receptacle-like cutters adapted to telescope snugly one within the other and means on the back of said cutters for receiving said U-shaped forked arms.

3. The device of claim 2 in which the means on the back of said cutters for receiving said U-shaped forked arms consists of tubes.

4. A cutting device, particularly adapted for cutting sandwiches, pastry, meat, cheese and the like comprising two pivoted handles terminating in quadrant arms, oppositely disposed, detachable, receptacle-like cutters adapted to telescope snugly one within the other and means on the back of said cutters for receiving said quadrant arms.

5. The device of claim 4 in which the means on the back of said cutters for receiving said quadrant arms consist of corresponding quadrant tubes.

ZELMA P. CORDWELL.